United States Patent [19]

Martin

[11] 4,365,847

[45] Dec. 28, 1982

[54] PROCESS AND DEVICE FOR BRAKING A WHEEL BY INTEGRATED PRESSURE PULSES

[75] Inventor: Henri Martin, Saint Nazaire, France

[73] Assignee: Societe Nationale Industrielle Aerospatiale, Paris, France

[21] Appl. No.: 243,347

[22] Filed: Mar. 13, 1981

[30] Foreign Application Priority Data

Mar. 25, 1980 [FR] France ............................ 80 06576

[51] Int. Cl.³ .......................................... B60T 8/00
[52] U.S. Cl. ...................................... 303/93; 303/104
[58] Field of Search ................. 303/61, 91, 93, 95, 303/104, 108, 111

[56] References Cited

U.S. PATENT DOCUMENTS

| 3,656,816 | 4/1972 | Schlitz et al. | 303/104 |
| 4,293,165 | 10/1981 | Hirzel | 303/93 |
| 4,320,459 | 3/1982 | Lindemann et al. | 303/111 |

Primary Examiner—Duane A. Reger
Attorney, Agent, or Firm—Merriam, Marshall & Bicknell

[57] ABSTRACT

The present invention relates to a process and device for braking a wheel, particularly of an aircraft taxiing on the ground. According to the invention, the action on the braking pedal is converted into electrical pulses of constant frequency and of variable duration, then into hydraulic fluid pulses which are then integrated before being applied to the brake.

15 Claims, 6 Drawing Figures

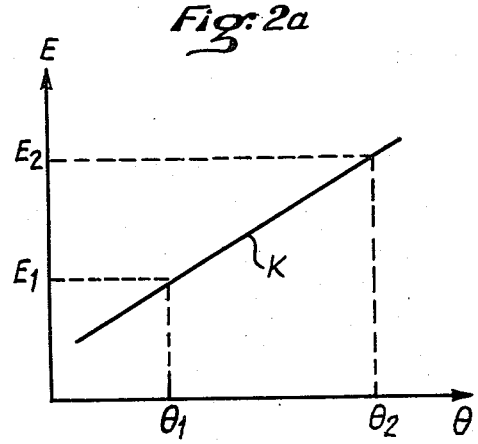
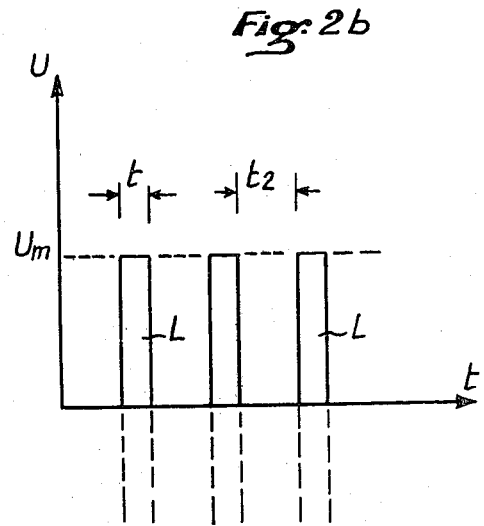
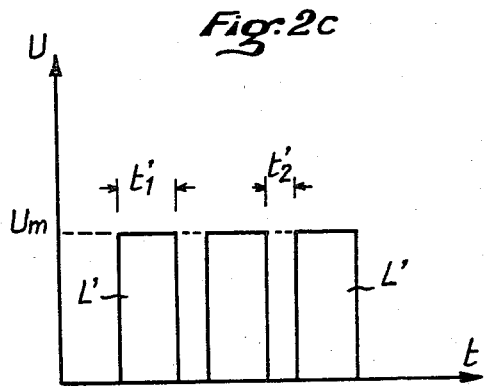
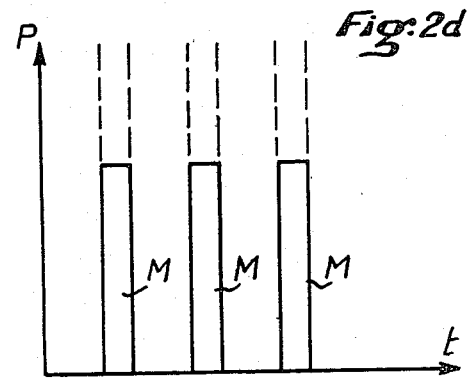
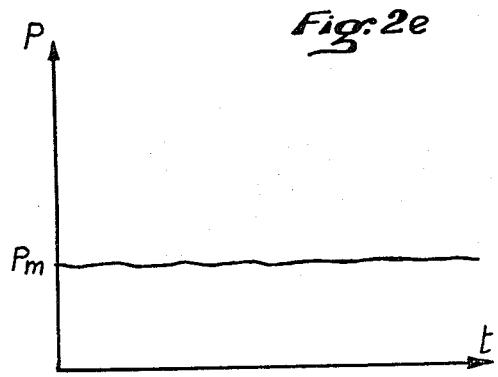

PROCESS AND DEVICE FOR BRAKING A WHEEL BY INTEGRATED PRESSURE PULSES

The present invention relates to a process and device for braking a wheel, particularly of an aircraft taxiing on the ground, by means of a brake supplied with fluid under pressure from a source under stable pressure and via a control member such as a pedal, which is voluntarily actuated.

It is known that, in a vehicle for which lightness is of prime importance, it is advantageous to control the braking pressure by an electrical signal coming from a low power control and remote from the power members. To this end, braking devices are already known in which said electrical signal is applied to servo-valves controlling the passage of the hydraulic fluid between a source, under stable pressure, of such a fluid and the brakes. However, such servo-valves are complex members, i.e. they are expensive and vulnerable; moreover, they are heavy.

It is an object of the present invention to provide a process and device for braking which eliminates the use of such servo-valves and therefore avoids the drawbacks thereof.

To this end, according to the invention, the process for braking a wheel, particularly of an aircraft taxiing on the ground, by means of a brake supplied with pressurised fluid from a source under stable pressure and via a voluntarily actuated control member, is noteworthy in that the actuation of said control member is converted into a first temporal sequence of electrical pulses of constant frequency such that the duration of each of them is a function of the instantaneous amplitude of said actuation, in that said first sequence of pulses is then converted into a corresponding second temporal sequence of fluid pressure pulses, such that with each electrical pulse is associated a pressure pulse representative of said electrical pulse, in that the pressure pulses of said second sequence are integrated in order to obtain a mean pressure and in that said means pressure is applied to said brake.

Thus, this integrated mean pressure is representative of the effort of the pilot exerted on said control member, i.e. generally a pedal. The relation between this mean pressure and the duration of each pulse is faithful on condition that the hydraulic receiver has a law of constant stiffness, which is the case of a disc brake with hydraulic application, for example, when the discs are in contact.

Said first and second sequences are preferably constituted by pulses of constant amplitude and frequency, but of width variable as a function of the amplitude of the actuation of said control member.

It will be noted that a brake with hydraulic application is noteworthy in that it firstly requires a quantity of fluid at low pressure for bringing the discs into contact, then it becomes an obstacle of considerable stiffness of hydraulic pressure. Thus, it is advantageous if the at least partial suppression of the integration is provided below a certain threshold of fluid pressure in the brake. Thus, a rapid contact of the discs may be obtained, the rate of flow in the direction of the brake being high, then, when the discs are in contact, the level of the braking pressure is controlled by the sequence of pulses.

The displacement of the control member (depression of a pedal) may advantageously be felt by the pilot as the volume of fluid to be displaced in the brake, in the same way as the effort on the control member may represent the pressure applied to the brake.

Thus, the contact of the discs may be controlled as from the first movement of the control member, and maintained during a dead stroke which is effected under a weak effort.

The pressure at the brake may then increase without delay with the effort applied in accordance with a law acceptable to the pilot.

An important advantage of the invention resides in that the hydraulic control member may be a simple electrovalve capable of accepting orders in D.C. voltage: for example, in the case of aircraft, braking orders may be sent automatically simply by using the DC of 28 volts on board, without it being necessary to pass via a specific member.

Similarly, slackening orders coming from an anti-skid device are directly and simply acceptable by cutting off an electrical line of the pressure level control device.

Various safety devices may be introduced in the electrical circuit: for example, the maximum pressure may be limited to a predetermined value lower than the generation pressure by using for example a switch whose role would be to cut off supply of the electrovalve when the pressure has reached the setting of said switch.

The system then functions similarly to its normal mode of functioning, but in closed loop.

A device for carrying out the invention, comprising a brake supplied with pressurised fluid from a source under stable pressure and via a control member of which the voluntary actuation is converted, by a transmitter, into an analog signal function of the amplitude of said actuation, is noteworthy in that it comprises first means for converting said analog signal into a first temporal sequence of electrical pulses at constant frequency, such that the duration of each of them is a function of the amplitude of said analog signal, second means for converting said first sequence of pulses into a second sequence of fluid pressure pulses, such that with each electrical pulse is associated a pressure pulse representative of said electrical pulse and means for integration of said pressure pulses of said second sequence.

Said first means preferably comprise a multivibrator provided with at least one component with characteristic variable as a function of the amplitude of the analog signal. Said second means may comprise a three-way, two-position valve, adapted to place in communication, for the first of said positions, the brake and the return towards said source and, for the second of said positions, the brake and the pressure outlet of said source. This valve is advantageously constituted by a slide distributor, said slide being controlled by an electromagnet receiving said first sequence of pulses.

The integration means may be formed by a calibrated orifice.

To effect the at least partial suppression of the integration of the pressure pulses, a pipe may be mounted in parallel on the integration means, said pipe comprising a valve controlled by the pressure of the fluid in the brake. This valve may then be controlled by a pressure gauge connected to a pressure inlet disposed in the conduit connecting said second means to the brake.

The invention will be more readily understood on reading the following description with reference to the accompanying drawings, in which:

FIGS. 2a to 2e are diagrams explaining the functioning of the device of FIG. 1.

Figure 1:
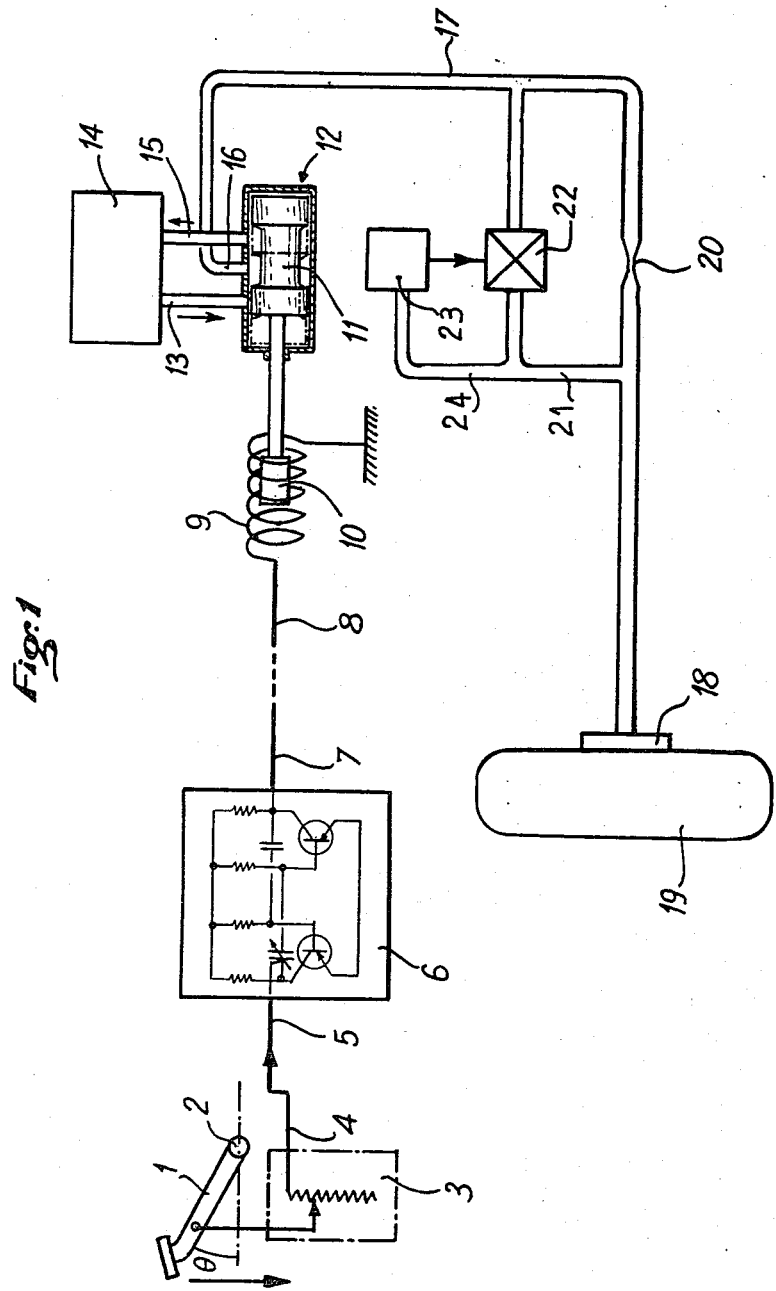
FIG. 1 is a schematic view of an embodiment of the braking device according to the invention.

Referring now to the drawings, FIG. 1 shows the braking device according to the invention, which comprises a pedal 1 adapted to pivot about a pin 2 and controlling a pedal transmitter 3. This transmitter 3, which, in the example shown, is of the displacement transmitter type (but which might also be of the effort pick-up type) furnishes at its output 4 an electrical quantity E (current or voltage), which is a function K of the angle of depression $\theta$ of the pedal 1 (cf. FIG. 2a).

The output 4 of the transmitter 3 is connected to the control input 5 of a generator 6 adapted to produce rectangular signals of constant amplitude, but of variable width and/or spacing as a function of the amplitude of the electrical quantity E applied to the control input 5. For example, as illustrated schematically in FIG. 1, the generator 6 presents the structure of a dissymmetrical multivibrator, of which the dissymmetry may be modified due to the variation in value of one of its constituents. In the present example, it has been assumed that one of the capacities of the crossed links was of the variable capacitor type and that the control input 5 was constituted by the bias electrode of this variable capacitor.

Thus, at the output 7 of the generator 6, square pulses of constant amplitude are obtained whose duration and/or spacing are a function of the amplitude of the quantity E and therefore of the angle of depression $\theta$ of the pedal 1. FIGS. 2b and 2c respectively show, as a function of time t, the square pulse signal U obtained at the output 7 of the generator 6 in the case of the pedal being depressed by an angle $\theta_1$ or $\theta_2$. In the first case, the square pulses L, of which the amplitude is $U_m$, have a width $t_1$ and are spaced by $t_2$, with $t_1 < t_2$ and $t_1 + t_2 =$ constant. In the second case, the square pulses L', of which the amplitude is still $U_m$, have a width $t'_1$ and are spaced by $t'_2$, with $t'_1 > t'_2$ and $t'_1 + t'_2 =$ constant.

The input signal K may be provided (and programmed) to be able to vary the ratio $$k = \frac{t_1}{t_2} \left( \text{or } \frac{t'_1}{t'_2} \right) \text{ from 0 to 100\%.}$$

Due to a transmission line 8, the signal U appearing at the output 7 of the generator 6 supplies, possibly after amplification and shaping, the coil 9 of an electromagnet, of which the core 10 is rendered fast with a slide 11 of a distributor 12. This distributor 12 comprises three orifices, of which the first, 13, is connected to the outlet of a source 14 of fluid under stable pressure (for example of between 50 and 200 bars) and of which the second, 15, is connected to the return of said source. The third orifice 16 is connected, by a conduit 17, to the brake 18 associated with a wheel 19. A calibrated orifice 20 is provided on the conduit 17.

In rest position of the electromagnet 9,10, the slide 11 is in the position shown in FIG. 1. and connects the orifice 16 with the return 15 of the source 14. On the other hand, when the electromagnet 9,10 is excited, the slide takes the position in dotted lines and connects the orifice 16 with the outlet 13 of the source 14.

Thus, at each square pulse L, the electromagnet 9,10 is excited for the corresponding duration $t_1$, so that the slide 11 is animated by a reciprocating slide movement between these two positions and this results in that, at orifice 16, the pressure P of the fluid varies temporally according to square pulses M synchronous with the square pulses L. At each square pulse L, a certain quantity $q_1$ of fluid passes from source 14 to the brake 18. Due to the orifice 20, this quantity $q_1$ is, at least at a first approximation, proportional to the square root of the difference between the pressure $P_g$ of the source 14 and the mean pressure $P_m$ in the brake, and to the duration $t_1$, so that the following may be written:

$$q_1 = \sqrt{P_g - P_m} \times t_1 \times C_1$$

where $C_1$ is a coefficient of proportionality.

On the other hand, during each interval between two square pulses L, the electromagnet 9,10 is de-energized and a certain quantity $q_2$ of fluid passes from brake 18 towards the return 15. This quantity $q_2$ is approximately proportional to the square root of the mean pressure $P_m$ in the brake and to the duration $t_2$, so that $$q_2 = \sqrt{P_m} \times t_2 \times C_2,$$

where $C_2$ is a coefficient of proportionality.

The pressure $P_m$ is stabilised after several cycles when $q_1 = q_2$ (cf. FIG. 2e). At that moment, $$\sqrt{P_g - P_m} \times t_1 \times C_1 = \sqrt{P_m} \times t_2 \times C_2 \text{ so that,}$$

$$P_m = P_g \frac{C_1^2 \times k^2}{C_2^2 + C_1^2 \times k^2},$$

with $k = (t_1/t_2)$.

It is therefore seen that, $P_g$ being constant, the value of the mean pressure $P_m$ in the brake 18 varies with the ratio $k = (t_1/t_2)$. However, oscillations about the mean pressure appear as a function of the stiffness of the fluid circuit, the frequency of the square pulses L and the dimensions of the calibrated orifice.

It may be envisaged using different orifices 20 for the quantities $q_1$ passing from the source 14 to the brake 18 and for the quantities $q_2$ passing from the brake 18 to the source 14, although this has not been shown in the drawings. Thus, by choosing for quantities $q_2$ an orifice of larger diameter than for the quantities $q_1$, the balancing of the pressure $P_m$ may be accelerated.

Furthermore, particularly for accelerating the contact of the discs of the brake 18, shunting of the orifice 20 may be provided. To this end, in a shunt conduit 21 in parallel on the orifice 20, a by-pass valve 22 is disposed which is adapted to be controlled by a pressure gauge 23 of which the pressure inlet 24 is connected to the conduit 21. The pressure gauge 23 maintains the valve 22 open below a certain pressure threshold of the conduit 21, but controls said valve 22 up to closure above said threshold. Thus, the orifice 20 is shunted upon initial establishment of the pressure in the brake 18, so that this initial establishment may be rapid. From said threshold, the valve 22 then closes so that the fluid is obliged to pass through orifice 20, which integrates the pressure pulses in the manner described hereinabove. The constant frequency of said pulses may for example be 50 Hz.

What is claimed is:

1. A process for braking a wheel, particularly of an aircraft taxiing on the ground, by means of a brake supplied with fluid under pressure from a source under stable pressure, and via a control member actuated voluntarily, said process comprising the steps of:

converting the actuation of said control member into a first temporal sequence of electrical pulses at constant frequency, such that the duration of each of them is a function of the instantaneous amplitude of said actuation, converting said first sequence of pulses into a corresponding second temporal sequence of fluid pressure pulses, such that with each electrical pulse is associated a pressure pulse representative of said electrical pulse, integrating the pressure pulses of said second sequence in order to obtain a mean pressure, and applying said means pressure to said brake.

2. The process of claim 1, wherein said first and second sequences are constituted by pulses of constant amplitude and frequency, but of variable width as a function of the amplitude of the actuation of said control member.

3. The process of either one of claims 1 or 2, wherein, below a certain pressure threshold of the fluid in the brake, the integration is at least partially suppressed.

4. A braking device for a wheel comprising a brake associated with said wheel and adapted to be actuated by fluid pressure;

a source of fluid under stable pressure, said source having a pressure outlet and a return;

a control member;

first means for converting voluntary actuation of said control member into an analog signal comprising a first temporal sequence of electrical pulses at constant frequency, the duration of each pulse being a function of the instantaneous amplitude of said actuation;

second means for converting said first sequence of pulses into a corresponding second temporal sequence of pressure pulses of said fluid, each pressure pulse being associated with and representative of an electrical pulse in said first temporal sequence;

means for integrating said pressure pulses to obtain a mean fluid pressure, and means for supplying said mean fluid pressure to said brake for actuation thereof.

5. The device of claim 4, wherein said second means comprises a three-way, two-position valve, adapted to place in communication, in a first position, the brake and the return towards said source, and, in a second position, the brake and the pressure outlet of said source.

6. The device of claim 5, wherein said valve comprises a slide distributor, said slide being controlled by an electromagnet receiving said first sequence of pulses.

7. The device of claim 4, wherein said integration means comprises a calibrated orifice.

8. The device of claim 4, wherein said first means comprises a multivibrator having at least one component with a characteristic which varies as a function of the amplitude of said analog signal.

9. The device of claim 8, wherein said integration means comprises a calibrated orifice.

10. The device of claim 8, wherein said second means comprises a three-way, two-position valve, adapted to place in communication, in a first position, the brake and the return to said source, and, second position, the brake and the pressure outlet of said source.

11. The device of claim 10, wherein said integration means comprises a calibrated orifice.

12. The device of claim 10, wherein said valve comprises a slide distributor, said slide being controlled by an electromagnet receiving said first sequence of pulses.

13. The device of claim 12, wherein said integration comprises a calibrated orifice.

14. The device of any one of claims 4, 5, 6, 7, 8, 9, 10, 11, 12 or 13, wherein a by-pass valve controlled by the pressure of the fluid in the brake is mounted in parallel with said integration means.

15. The device of claim 14, wherein said valve is controlled by control means responsive to the fluid pressure supplied to said brake, said control means maintaining said valve open when said fluid pressure falls below a predetermined threshold value and closed when the fluid pressure equals or exceeds said threshold value.

* * * * *